United States Patent [19]
Chandaria

[11] Patent Number: 5,958,090
[45] Date of Patent: Sep. 28, 1999

[54] ARTIFICIAL FIRE LOG WITH AN EASILY EXPOSED ROUGH IGNITABLE AREA

[76] Inventor: Ashok Velji Chandaria, P.O. Box 48870, Nairobi, Kenya

[21] Appl. No.: 09/082,023

[22] Filed: May 20, 1998

[51] Int. Cl.[6] ............................. C10L 11/06; C10L 5/00
[52] U.S. Cl. ............................. 44/535; 44/531; 44/532
[58] Field of Search ............................. 44/535, 531, 532

[56] References Cited

U.S. PATENT DOCUMENTS

| | | | |
|---|---|---|---|
| 181,033 | 8/1876 | Brown | 44/531 |
| 196,596 | 10/1877 | Reed | 44/531 |
| 3,056,665 | 10/1962 | Linda et al. | 44/531 |
| 3,877,886 | 4/1975 | Dalzell | 44/519 |
| 4,043,765 | 8/1977 | Tanner | 44/535 |
| 4,060,396 | 11/1977 | Burton | 44/531 |
| 4,179,269 | 12/1979 | Yates et al. | 44/535 |
| 4,308,032 | 12/1981 | Benson | 44/535 |
| 4,539,011 | 9/1985 | Kretzschmann | 44/535 |
| 4,883,498 | 11/1989 | MacIsaac | 44/535 |
| 5,066,311 | 11/1991 | Chalmer | 44/535 |

Primary Examiner—Ellen M. McAvoy
Attorney, Agent, or Firm—Sand & Sebolt

[57] ABSTRACT

A fire log or fire starter extruded to include a plurality of elongated sawdust and paraffin bodies attached to an adjacent body by a reduced thickness neck of sawdust and paraffin that is easily severed or snapped apart. Each severed neck provides a rough and thus easily ignitable edge on each body with exposed flammable fibers or sawdust particles.

17 Claims, 2 Drawing Sheets

5,958,090

ARTIFICIAL FIRE LOG WITH AN EASILY EXPOSED ROUGH IGNITABLE AREA

BACKGROUND OF THE INVENTION

1. Technical Field

The invention relates to artificial fire logs and fire starters. More particularly, the invention relates to artificial fire logs and fire starters that provide the consumer with a rough and thus easily ignitable edge. Specifically, the invention is a fire log or fire starter extruded such that a plurality of elongated sawdust and paraffin bodies are attached together by a reduced thickness neck of sawdust and paraffin that is easily severed or snapped apart whereby the severed neck provides a rough and thus easily ignitable edge with exposed fibers.

2. Background Information

Various types of fuel bodies, such as artificial fire logs and fire starters, have been developed. These fuel bodies, hereinafter referred to as fire logs which is meant to encompass fire starters and other artificial fuel bodies as well, have a number of uses. The most common use of fire logs and fire starters is by residential homeowners in a home fireplace to provide heat and/or an attractive fire closely simulating that of a natural wood fire without all of the mess and work associated with real wood.

Generally, these fire logs are formed of particulate flammable materials which are compressed into a predetermined and desirable shape. Most fire logs are formed of compressed sawdust, coal particles or other flammable materials. The particulate materials are combined with various wax binders and other binders for maintaining the desired shape of the fire log. These fire logs also may contain various types of additives therein to enhance burning or to produce a colored flame.

Fire logs made of particulate flammable materials, wax or similar binders, and additives, are generally formed by a continuous extrusion process. In a continuous extrusion process, the particulate flammable materials, appropriate binders and additives are compressed within an extrusion bore. The extruded stream exiting the bore is then cut into predetermined sizes and shapes, and then subsequently placed in a protective wrapper. The finished fire log has a smooth outer surface as a result of the extrusion process.

It is well known in the field that providing some form of wick or wrapping for rapid or more easy ignition of the fuel body is extremely beneficial. This eliminates the need for starter fuels or other igniter. Often newspaper or other paper is often used in place of or in conjunction with a wick or wrapper to assist or further assist in the lighting of the fire log.

Another known way of assisting the ignition process is the scratching or roughening of the surface of the fire log and then lighting the roughened area and particularly the exposed fibers. The consumer can perform this roughening step just prior to use although most consumers desire a ready to use, no mess fire log or starter. Manufacturers of such fire logs have tried to provide factory outer surfaces of a roughened or partially roughened nature where surface roughening is provided either during extruding or thereafter by an additional manufacturing step. However, the nature of the wax fire log is such that the surfaces becomes hard and smooth during packaging and/or shipping.

Special shipping containers or trays can be provided to maintain the roughened surface or edge by maintaining the separation between fire logs, controlling the environment and/or temperature, and/or protecting the roughened surface or edge. Such containers and trays are cost prohibitive as each adds needless cost, size, and other detrimental, costly, or undesirable factors to the production.

As a result, the present technology does not meet the optimal needs and desires of the consumers for an easy to ignite fire log. It is thus desirable to provide a fire log with a roughened edge or surface for easy ignition without the need for special trays, containers, wrappings, etc.

In addition, the present technology is such that each fire log and/or fire starter is separately extruded through a single extrusion die. Economies of scale and other considerations make continuous extrusion of multiple fire logs or fire starters through multiple dyes intercommunicating with one another so as to provide an extruded cross-sectional configuration of at least two or more fire logs in operative communication far more desirable.

SUMMARY OF THE INVENTION

Objectives of the invention include providing an improved fuel body, and more specifically improved fire logs and/or starters.

An additional objective is to provide such an improved fire log or starter that is easy and ready to ignite.

A further objective is to provide such an improved fire log or starter that does not require any special wrappings or wicks.

A still further objective is to provide such an improved fire log or starter that does not require any special packaging.

Another objective is to provide such an improved fire log or starter that has a roughened or scratched easy to ignite area.

Yet another objective is to provide such an improved fire log or starter that provides such roughened or scratched surface at the point of use by the consumer.

A still even further objective is to provide such an improved fire log or starter which is two or more sections separated by an easily and readily severable or otherwise separable neck that once broken provides the necessary roughened surface or edge.

Still yet another objective of the present invention is to provide an improved fire log manufacturing process which allows for continuous extrusion of multiple logs or sections rather than non-continuous extrusion of single logs which is more time consuming and costly.

These and other objectives and advantages of the invention are obtained by the improved fire log or starter, the method of manufacture and the method of use of the present invention, the general nature of which may be stated as including a method of igniting an artificial fire log which includes breaking the fire log into two pieces along a predefined weak plane in the fire log thereby defining a rough surface along the break, and thereafter igniting the rough surface. Such a method is performed using a fire log that includes an elongated flammable body formed of a compressed particulate material and a binder. The elongated body also has a pair of opposing longitudinal surfaces each having an elongated groove therein that defines a reduced cross sectional dimensioned area in the body susceptible to separation. The elongated grooves in the opposing surfaces defining a first section and a second section of the elongated body.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

The invention is an improved fuel body such as a fire log or starter, hereinafter referred to as a fire log and shown in FIG. 1 as 10. In general, the fire log is preferably an elongated body of similar shape, size and dimension to a wood log. The fire log 10 is formed of any known materials that are useful for fire logs including particulate flammable materials, wax and other binders or resins, and additives. In particular, the fire log 10 is formed of a particulate flammable material such as cellulose particles, coal particles, and/or other materials well known in the art. These particulate materials are maintained in a predetermined shape by wax binders or resins, or a similar material as is well known in the art. One example of a fire log composition is a mixture of compressed sawdust and a wax binder, although obviously this may vary without affecting the concept of the invention as described below.

Fire log 10 is manufactured by an extrusion or other similar process. The particulate flammable materials, wax and other binders or resins, and additives are mixed together as is well known in the art. The mixture is then compressed and ejected under such compression through an extrusion head or die. The extrusion head defines the desired cross sectional shape of the fire log.

Figure 1:
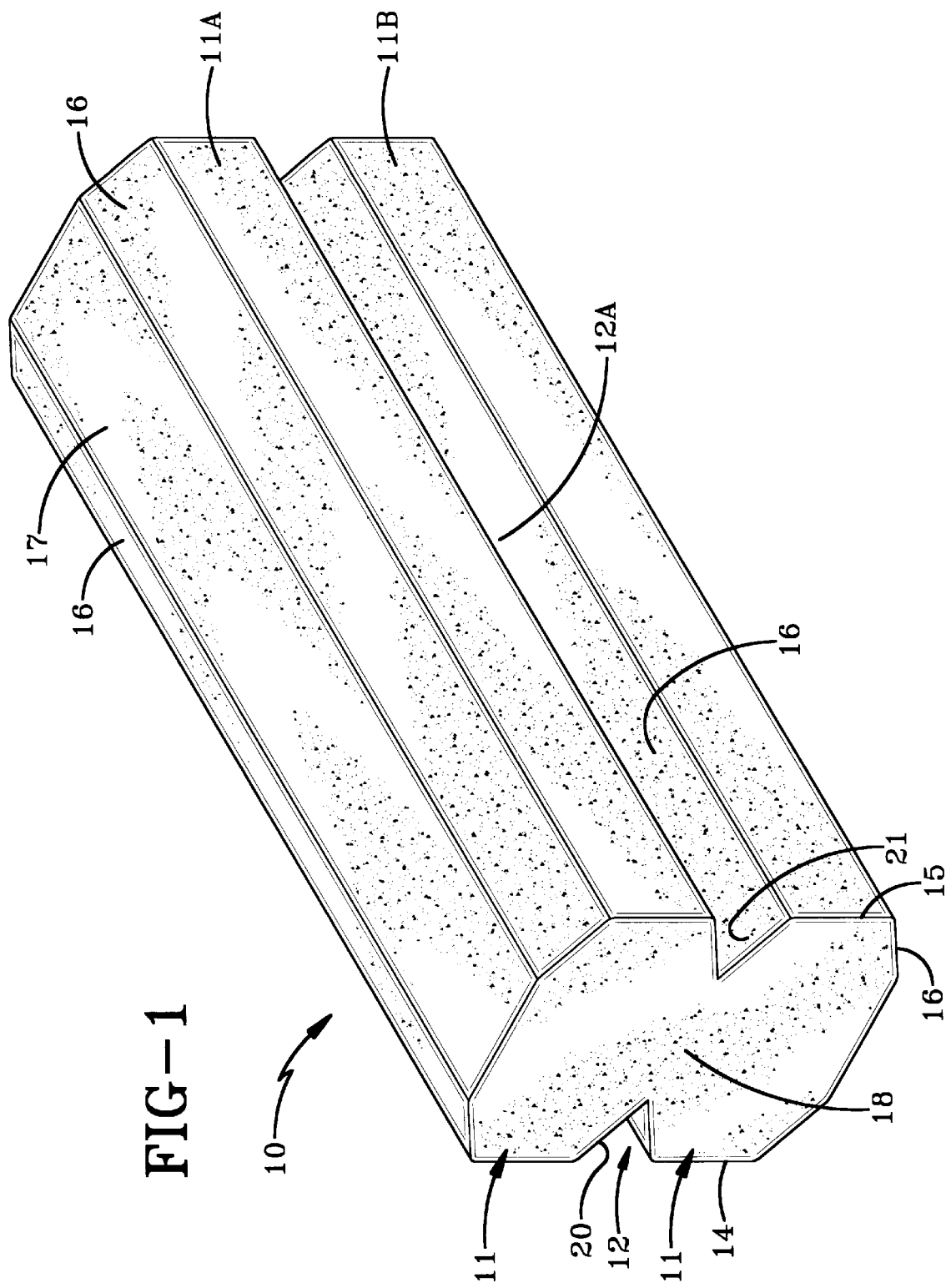
FIG. 1 is a perspective view of an improved fire log or starter of the present invention with its two sections separated by a reduced diameter and easily breakable or severable neck.
Figure 2:
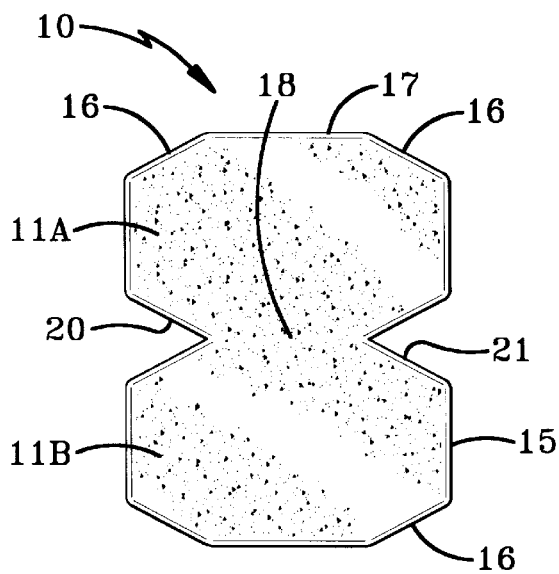
FIG. 2 is an end view of the improved fire log or starter of FIG. 1.

In accordance with one of the main features of the invention, fire log 10 includes a plurality of sections 11, each of the adjacent sections being separated by a reduced dimension neck 12 for defining an easy breaking, severing, or snapping plane between adjacent sections such as neck 12A between sections 11A and 11B in FIGS. 1-2. More particularly, the area of reduced material thickness is created along shared area 18 by the longitudinal plane of each of end sections 11A and 11B are in contraminious relationship to one another.

In more detail and as shown in the displayed embodiment, two sections 11 are shown, namely first section 11A and second section 11B with first neck 12A therebetween of a reduced dimension. The first and second sections 11A and 11B are elongated bodies of polygonal cross section, in this case octagonal. Each section 11 includes a pair of opposed side faces 14 and 15 and multiple optional transition faces 16.

If the section 11 is an end section as both 11A and 11B are in the two section displayed embodiment, then each section also contains an end face 17 and a shared area 18 defining the neck 12. If instead at least three sections exist, then a non-end section exists and each non-end section has two shared areas 18 and no end faces.

In accordance with one of the features of the invention, the shared area 18 is a longitudinal plane of a dimension less than the distance between opposing side faces 14 and 15. This is the neck 12 as defined above. This is extruded into the fire log 10 during extrusion. As a result, a weak plane is defined in the shared area 18 which is between elongated grooves 20 and 21 as extruded during manufacture and best shown in FIG. 2.

Figure 3:
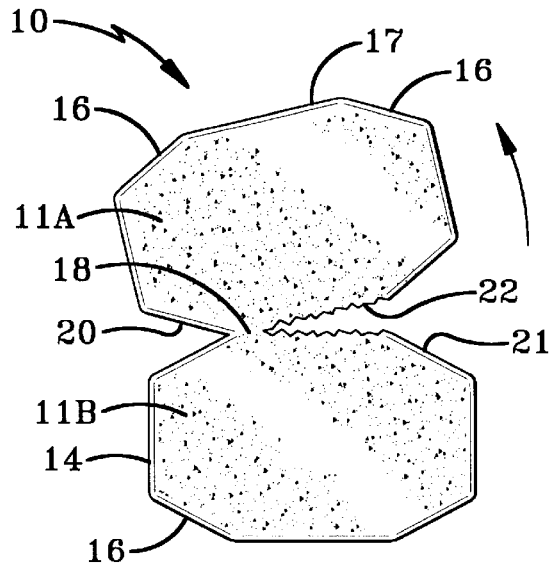
FIG. 3 is the same end view as in FIG. 2 except the two sections are being broken or severed in an easy snap apart manner.

As a result, the fire log 10 may have a smooth outer surface (no roughing is needed) and no wick or wrapping. It is capable of being shipped in any standard container or tray. When ignition is desired, the user merely breaks the fire log along each neck 12. In the displayed embodiment, one neck 12 exists and the severing, snapping or other breaking step is performed by a simple and easy pulling apart motion along one groove 20 as shown in FIG. 3. This breaking step defines a roughened surface 22 on each section 11A and 11B as shown in FIG. 3. This roughened surface 22 results from the non-uniform separation of the materials the fire log is comprised of including the particulate material such as the sawdust, coal particles or other similar material. As a result, substantially more surface area of each particle in the fire log is exposed resulting in easy ignition.

Figure 4:
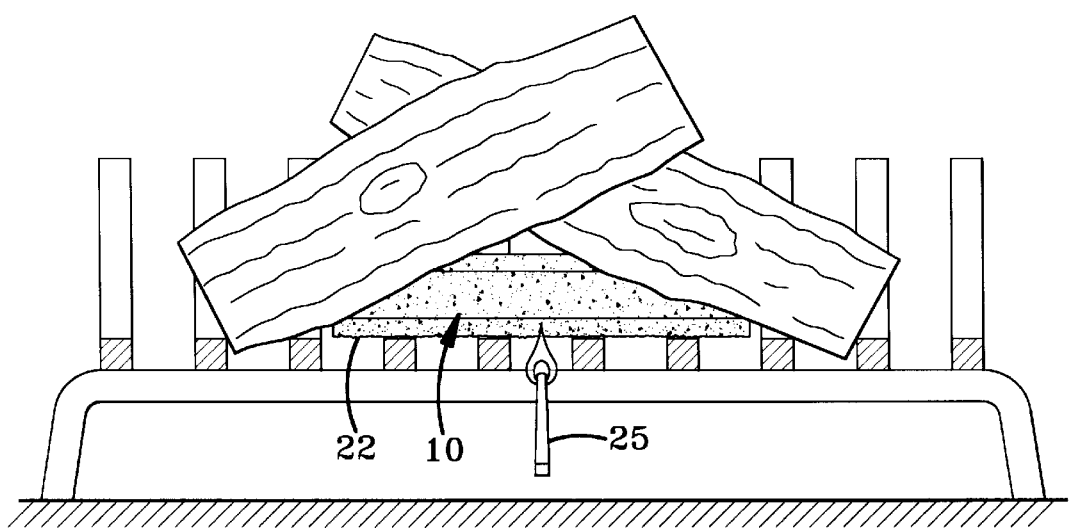
FIG. 4 is a front environmental view of a broken apart fire starter of the present invention with the roughened edge forwardly exposed and a pair of logs resting thereon.

After the fire log is placed in the fireplace or other fire box, the roughened surface or edge 22 is then easily ignited using any ignition means 25 such as a match, ignitor or other well known spark providing mechanism. This is shown in FIG. 4. The fire log 10 may be burned alone, with other fire logs, or as a fire starter with real wood as shown in FIG. 4.

It is contemplated and within the scope of the invention that each section could be of other shape or dimensions. As to the cross sectional shape of each section which in the displayed embodiment is modified octagonal, it is contemplated and within the scope of the invention that each section may be of any polygonal cross sectional shape or of a circular, oval or any other shape capable of being produced by an extrusion process.

In addition, it is contemplated and within the scope of the invention that the neck between each section could attach the sections axially or transversely and thus separate the sections in an end-to-end or oblique setup rather than a side-by-side setup with a longitudinal plane. However, it is believed that the displayed embodiment is most efficient as it provides the most roughened space during severing.

Accordingly, the improved fire log achieves all the enumerated objectives, provides for eliminating difficulties encountered with prior games, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved fire log is constructed and used, the characteristics of the construction, and the advantageous, new and useful results obtained; the new and useful structures, devices, elements, arrangements, parts and combinations, are set forth in the appended claims.

I claim:

1. A method of igniting an artificial fire log, the method comprising the steps of:
   providing an elongated fire lo having a longitudinally-oriented neck of reduced material thickness formed by a pair of grooves;
   breaking the fire log into two pieces along the longitudinally-oriented neck in the fire log thereby defining a rough surface along the break; and
   igniting the rough surface.

2. The method of claim 1 further comprising the step of providing a fire log having a first elongated portion and a second elongated portion with a neck therebetween as the weak plane.

3. The method of claim 2 wherein the providing step includes the step of extruding a fire log.

4. The method of claim 2 further comprising the step of providing a fire log with a pair of elongated grooves therein for defining the weak plane.

5. The method of claim 1 wherein the step of breaking the fire log along the weak plane includes the step of tearing a first portion of the fire log away from a second portion of the fire log along the weak plane.

6. A fire log assembly comprising:
   at least two elongated flammable bodies formed of a compressed particulate material and a binder whereby each elongated flammable body is provided with a longitudinal surface whereby the elongated flammable bodies are operatively connected to one another along the longitudinal surface of each body;
   an area of reduced material thickness adjacent each of the longitudinal surfaces whereby at least two elongated bodies may be separated from one another along said area of reduced material thickness; and
   the bodies defining a pair of longitudinally-oriented grooves, said grooves forming said area of reduced material thickness.

7. The fire log of claim 6 wherein the elongated grooves in the opposing surfaces define a first section and a second section of the elongated body.

8. The fire log of claim 7 wherein the elongated grooves define a reduced cross sectional dimensioned area as a neck separating the first and second sections.

9. The fire log of claim 7 wherein each of the elongated grooves includes an innermost edge for defining a stress point during forcible separation of the first and second sections.

10. The fire log of claim 6 wherein each opposing surface includes a plurality of elongated grooves therein.

11. The fire log of claim 10 wherein each of the pluralilty of elongated grooves in one of the opposing surfaces is aligned with one of the plurality of elongated grooves in the other of the opposing surfaces whereby each such aligned pair of grooves defines a reduced cross sectional dimensioned area in the body susceptible to separation.

12. The fire log of claim 11 wherein each of the elongated grooves includes an innermost edge for defining a stress point during forcible separation of the first and second sections.

13. A fire log comprising an elongated flammable body formed of a compressed particulate material and a binder, the elongated body including a first elongated section and a second elongated section separated by a neck susceptible of forced separation and a pair of longitudinally-oriented grooves parallel with and adjacent alternate sides of said neck.

14. The fire log of claim 13 wherein the neck is defined by a pair of opposing elongated grooves.

15. The fire log of claim 14 wherein each of the elongated grooves includes an innermost edge for defining a stress point during forcible separation of the first and second sections.

16. The fire log of claim 13 wherein the elongated body includes a third elongated section separated from the second elongated section by a second neck susceptible to forced separation.

17. The fire log of claim 16 wherein each of the elongated grooves includes an innermost edge for defining a stress point during forcible separation of the any of the sections from each other.

* * * * *